(12) United States Patent
Wear et al.

(10) Patent No.: US 7,130,721 B2
(45) Date of Patent: Oct. 31, 2006

(54) ELECTROHYDRAULIC CONTROL SYSTEM

(75) Inventors: Jerry A. Wear, East Peoria, IL (US); Hongliu Du, Dunlap, IL (US); Greg A. Ferkol, Morton, IL (US); Mark P. Vonderwell, Dunlap, IL (US); Jeff L. Kuehn, Metamora, IL (US); Jason L. Brinkman, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 172 days.

(21) Appl. No.: 10/975,984

(22) Filed: Oct. 29, 2004

(65) Prior Publication Data

US 2006/0095163 A1    May 4, 2006

(51) Int. Cl.
*G05D 7/00* (2006.01)
*F15B 13/00* (2006.01)

(52) U.S. Cl. ........................................ 700/282; 91/418
(58) Field of Classification Search ................ 700/281, 700/282, 301, 304; 137/19, 565; 60/696, 60/701; 91/418–422; 417/279, 437, 440, 417/441
See application file for complete search history.

(56) References Cited

U.S. PATENT DOCUMENTS

| | | | |
|---|---|---|---|
| RE33,846 E | | 3/1992 | Kramer et al. |
| 5,428,958 A | | 7/1995 | Stenlund |
| 5,666,806 A | | 9/1997 | Dietz |
| 5,947,140 A | * | 9/1999 | Aardema et al. ............... 137/1 |
| 5,960,695 A | * | 10/1999 | Aardema et al. ............. 91/433 |
| 6,073,442 A | * | 6/2000 | Creger et al. .................. 60/446 |
| 6,267,041 B1 | * | 7/2001 | Skiba et al. ................... 91/436 |
| 6,374,722 B1 | | 4/2002 | Du et al. |
| 6,375,433 B1 | | 4/2002 | Du et al. |
| 6,468,046 B1 | | 10/2002 | Du et al. |
| 6,495,076 B1 | * | 12/2002 | Wolf ......................... 264/40.5 |
| 6,498,973 B1 | | 12/2002 | Dix et al. |
| 6,598,391 B1 | * | 7/2003 | Lunzman et al. ............. 60/327 |
| 6,623,247 B1 | | 9/2003 | Du |
| 6,718,759 B1 | * | 4/2004 | Tabor ........................... 60/368 |
| 6,732,512 B1 | * | 5/2004 | Pfaff et al. .................... 60/428 |
| 6,775,974 B1 | * | 8/2004 | Tabor ........................... 60/422 |
| 6,848,254 B1 | | 2/2005 | Du |
| 6,848,888 B1 | | 2/2005 | Du et al. |
| 6,951,102 B1 | * | 10/2005 | Tabor ........................... 60/368 |
| 6,988,363 B1 | * | 1/2006 | Bitter ........................... 60/468 |

\* cited by examiner

*Primary Examiner*—Maria N. Von Buhr
(74) *Attorney, Agent, or Firm*—Finnegan,Henderson, Farabow,Garrett&Dunner

(57) ABSTRACT

Consistent with an aspect of the disclosure, a method for controlling a hydraulic cylinder is provided. The hydraulic cylinder is provided with a chamber and configured to receive fluid from a valve. The method includes receiving a user input and determining a desired velocity of the hydraulic cylinder in accordance with the user input. In addition, the velocity of the hydraulic cylinder is measured and a position of the valve is determined in accordance with the desired velocity of the hydraulic cylinder and the measured velocity of the hydraulic cylinder. The method further includes determining a desired force to be applied to the valve in accordance with a difference between the desired and measured velocities of the hydraulic cylinder, and actuating the valve in accordance with the desired force to thereby inject the fluid into the chamber and move the hydraulic cylinder.

30 Claims, 9 Drawing Sheets

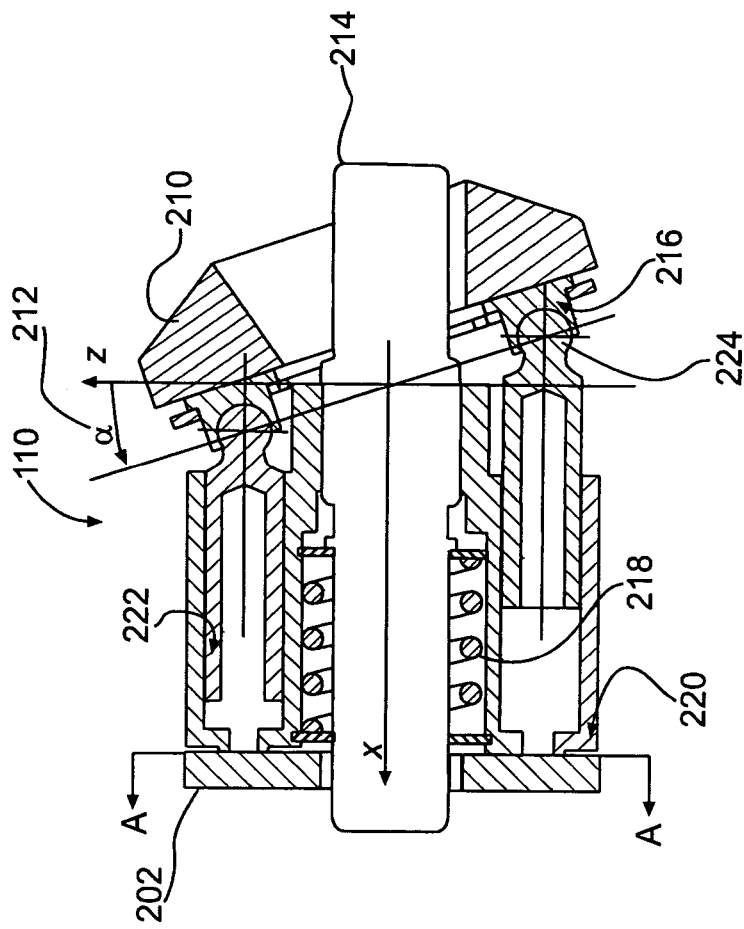
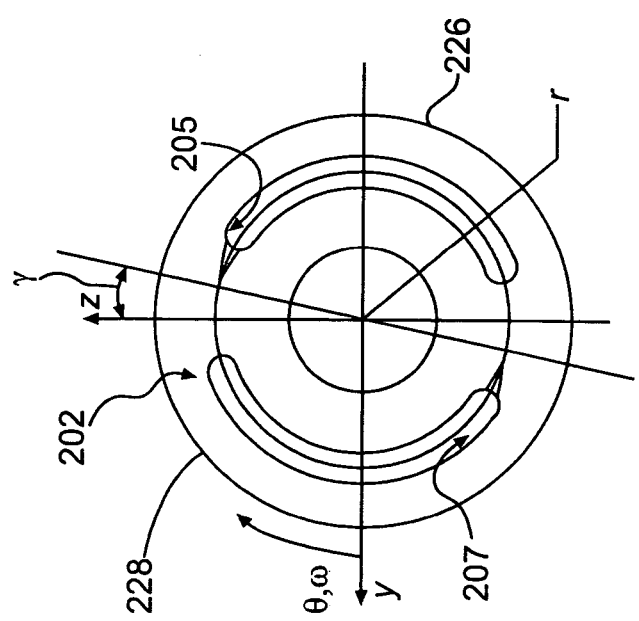
FIG. 2B
FIG. 2A

ELECTROHYDRAULIC CONTROL SYSTEM

TECHNICAL FIELD

The present disclosure is directed toward an electrohydraulic control system and related method.

BACKGROUND

Electrohydraulic systems are widely deployed in earthmoving machines, and other applications requiring high mechanical power. Typically, in such systems, a pump supplies hydraulic fluid under pressure to a cylinder or other actuated device. Both the pump and cylinder operate under electronic control of the applied hydraulic fluids. In order to assure proper operation, the hydraulic fluid should be output at constant pressure.

So-called "variable displacement pumps" have been developed that can selectively increase or decrease fluid pressure so that a uniform output pressure can be maintained. The manufacturing tolerances and assembly matching requirements for such pumps, however, are typically high in order to maintain stable and precise control of the output fluid pressure.

Hydraulic cylinders are often controlled with linearized control schemes, as described, for example, in U.S. Pat. No. 5,666,806, whereby hydraulic cylinder movement and position are correlated to pump output pressure. In particular, a table is often created by selecting data related to specific pump pressure values and hydraulic cylinder parameters, and, based on such data, extrapolating further cylinder parameters with linear control algorithms. The hydraulic cylinder is thus controlled by determining the pump pressure, and then identifying corresponding hydraulic cylinder locations and velocities.

Linear control schemes, however, often require precision equipment that must be frequently calibrated, and may not perform well under extreme working conditions. Also, different linear control algorithms, as well as control elements (e.g. servos), may differ from one machine to the next, and one element to the next. Thus, an algorithm that may be suitable for one machine with particular control elements may not be suitable for another. Further, multiple high resolution sensors may be required in order to accurately detect pressures in various lines of the hydraulic system. Such sensors, however, substantially increase system cost.

In addition, linearized control schemes require accurate models of system behavior. A hydraulic system, however, cannot typically be modeled exactly, due to among other things, unpredictable system disturbances, environmental changes, and measurement noise. Thus, circumstances may arise in which linearized control schemes cannot precisely predict hydraulic cylinder movement, resulting in faulty operation.

The present disclosure is directed to overcome one or more of the shortcomings in the prior art.

SUMMARY OF THE INVENTION

Consistent with an aspect of the disclosure, a method for controlling a hydraulic cylinder is provided. The hydraulic cylinder is provided with a chamber and configured to receive fluid from a valve. The method includes receiving a user input and determining a desired velocity of the hydraulic cylinder in accordance with the user input. In addition, the velocity of the hydraulic cylinder is measured and a desired position of the valve is determined in accordance with the desired velocity of the hydraulic cylinder and the measured velocity of the hydraulic cylinder. The method further includes determining a desired force to be applied to the valve in accordance with a difference between the desired position of the valve and a measured position of the valve, and actuating the valve in accordance with the desired force to thereby inject the fluid into the chamber and move the hydraulic cylinder.

Consistent with an additional aspect of the present disclosure, a method for controlling a hydraulic cylinder with a chamber is provided. The method includes receiving an input from a user, and supplying fluid from a pump to a first valve in response to the input from the user. In addition, the method includes regulating application of the fluid to the hydraulic cylinder with the first valve. The pump includes a swash plate configured to pivot about a pivot point, and the swash plate is coupled to a second valve. In the method, supplying the fluid includes determining a desired pressure of the fluid at a location adjacent an output port of the pump in accordance with the user input, and measuring the actual pressure of the fluid at the location adjacent the output of the pump. In addition, a difference between the desired pressure and the actual pressure is determined. Supplying the fluid also includes controlling the second valve in accordance with the difference between the desired pressure and the actual pressure to adjust the angle of the swash plate. Further, regulating the application of the fluid includes determining a desired velocity of the hydraulic cylinder in accordance with the user input, and determining a desired force to be applied to the first valve in accordance with the desired velocity of the hydraulic cylinder and a measured velocity of the hydraulic cylinder. Regulating the application of the fluid also includes actuating the first valve in accordance with the desired force to thereby inject the fluid into the chamber and move the hydraulic cylinder.

Further, consistent with an aspect of the present disclosure, a hydraulic system is provided which includes a hydraulic cylinder provided with a chamber, and a valve. The hydraulic cylinder is configured to receive fluid from the valve and output fluid to the valve. A sensor is also included which is coupled to the hydraulic cylinder. The sensor is configured to measure a velocity of the hydraulic cylinder. In addition, a control circuit is provided which is coupled to the sensor and the valve, and is configured to receive a user input, determine a desired velocity of the hydraulic cylinder in accordance with the user input, and determine a desired force to be applied to the valve in accordance with the desired velocity of the hydraulic cylinder and the measured velocity of the hydraulic cylinder. The control circuit is also configured to control actuation of the valve in accordance with the desired force such that the fluid is injected into the chamber to thereby move the hydraulic cylinder.

BRIEF DESCRIPTION OF THE DRAWINGS

The accompanying drawings, which are incorporated in and constitute a part of this specification, illustrate several embodiments of the disclosed system and together with the description, serve to explain the principles of the disclosure.

FIGS. 2A and 2B illustrate different cross-sectional views of a pump;

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
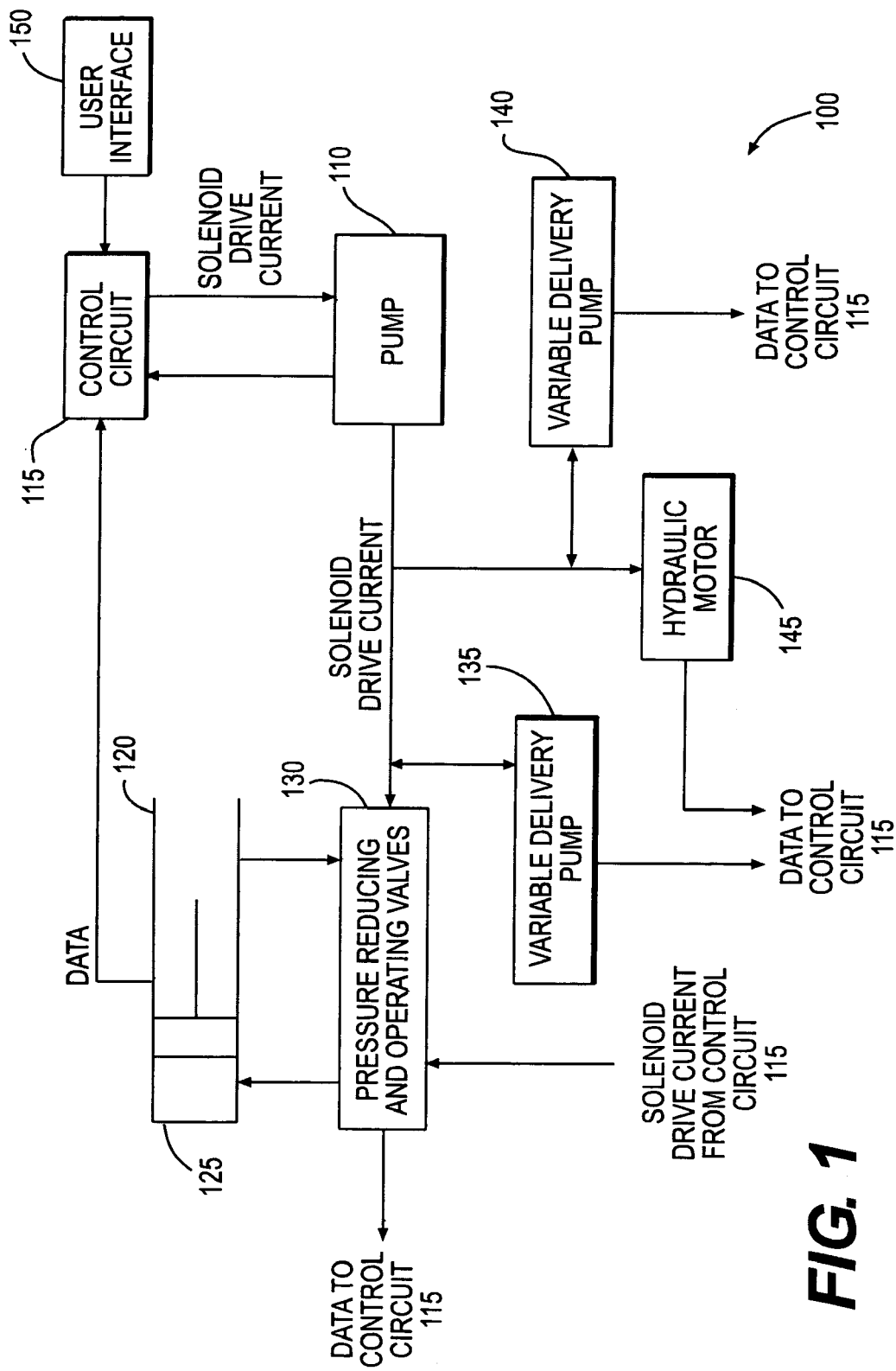
FIG. 1 illustrates an electrohydraulic system consistent with an aspect of the present disclosure.

FIG. 1 illustrates an electrohydraulic system 100 consistent with an aspect of the present disclosure. System 100 includes a user interface 150 through which an operator may generate a user input corresponding to a desired work function to be performed by cylinder 125 disposed within chamber 120, such as moving a bucket of an earth moving machine. Control circuit 115, which may include a suitably programmed microprocessor, digital signal processor or other appropriate combination of computer hardware and software, receives the user input. Control circuit 115 also receives operational data from other components of system 100, such as pump 110, variable delivery pump 140, hydraulic motor 145, variable delivery pump 135, and pressure reducing and operating valves 130. The data supplied by sensors on these components may include measured pump discharge pressure, motor operation pressure, and swash plate angles (to be described in greater detail below). Sensors provided on cylinder 125 and chamber 120 may provide other data related to measured cylinder head end pressures, cylinder rod end pressures, and cylinder positions. In response to the received data and the user input, control circuit 115 outputs solenoid drive currents to control a valve in pump 110 and pressure reducing and operating valves 130 (to be discussed in greater detail below). The valve in pump 110 adjusts the fluid pressure output from pump 110, and the pressure reducing and operating valves 130 adjust the output fluid pressure applied to cylinder 125.

Pump 110 supplies hydraulic fluid at or substantially near a desired discharge pressure to pressure reducing and operating valves 130, and or an optional hydraulic motor 145. Variable delivery pumps 135 and 140 may be provided to maintain the desired pressure of the fluid. The pressure reducing and operating valves 130 further regulate the pressure of the fluid injected into chamber 120 to move cylinder 125 by a desired amount and at a desired speed.

Although a single cylinder 125 is shown in FIG. 1, multiple cylinders can be provided, each receiving fluid from pump 110 or from multiple pumps, and each preferably having corresponding pressure reducing and operating valves 130.

Consistent with an aspect of the present disclosure, movement of hydraulic cylinder 125 is controlled independently of pump 110. In particular, control of hydraulic cylinder 125 is based on a difference between a desired velocity of hydraulic cylinder 125 related to the user input and a measured velocity of hydraulic cylinder 125, and does not rely on precise pump data. Hydraulic cylinder 125 can thus be accurately and reliably controlled. As set forth below, control of pump 110 will first be described, followed by disclosure of control of hydraulic cylinder 125.

FIG. 2B illustrates a detailed cross-sectional view of pump 110, and FIG. 2A illustrates a further cross-sectional view of pump 110 taken along line A—A in FIG. 2B. Pump 110 may be a variable delivery pump operating under control of control circuit 115. For example, pump 110 may be an axial piston swash plate hydraulic pump having a plurality of pistons 222, e.g., nine, located in a circular array within a cylinder block 220. Preferably, the pistons 222 are spaced at equal intervals defining a piston pitch circle about a shaft 214, located at a longitudinal center axis of the cylinder block 220. The cylinder block 220 is compressed tightly against a valve plate 202 by means of a cylinder block spring 218.

Each piston 222 is connected to a slipper 216, preferably by a ball and socket joint 224. Each slipper 216 is maintained in contact with a swash plate 210, which is inclinably mounted to the pump 110, and oriented at an adjustable angle of inclination α 212.

As further shown in FIG. 2A, valve plate 202 includes an intake port 205 and a discharge or output port 207. Intake port 205 receives fluid at a relatively low pressure over a low pressure region 226, while output port 207 provides a relatively high output or discharge pressure over a high pressure region 228. A transition area from the high pressure region 228 to the low pressure region 226 defines a pressure change region delineated by a swash plate pressure carry over angle γ.

The cylinder block 220 rotates at a constant angular velocity ω. As a result, each piston 222 periodically passes over each of the intake and discharge ports 205, 207 of the valve plate 202. The angle of inclination α of swash plate 210 causes the pistons 222 to undergo an oscillatory displacement in and out of the cylinder block 220, thus drawing hydraulic fluid into low pressure intake port 205, and out high pressure discharge port 207. The volume and amount of fluid pressure output from pump 110 is related to the magnitude of angle α. For small values of α, the stroke of pistons 222 is decreased, and pressure and discharge volume are thus relatively low. As α increases, however, piston stroke also increases, as do both pressure and discharge volume.

A control mechanism 300 for regulating pump 110 will next be described with reference to FIG. 3. Angle α is controlled through operation of biasing servo 306, control servo 304 and servo valve 302. Servo valve 302 is typically a conventional electro-hydraulic servo valve and includes spool 308 which is slidable over orifices 312 and 330. Lands 324 and 326 move with spool 308 and are proved with biasing springs (not shown) for maintaining the position of spool 308 within valve 302. In the configuration shown in FIG. 3, fluid is supplied from a pump output port 314 through a channel 320, orifices 330 and 312 and to control servo 304. The pressure exerted by such fluid, in cooperation with a servo spring 310, acts to push a cylinder 305 to the right in FIG. 3, thereby increasing the angle of inclination α of swash plate 210.

Figure 3:
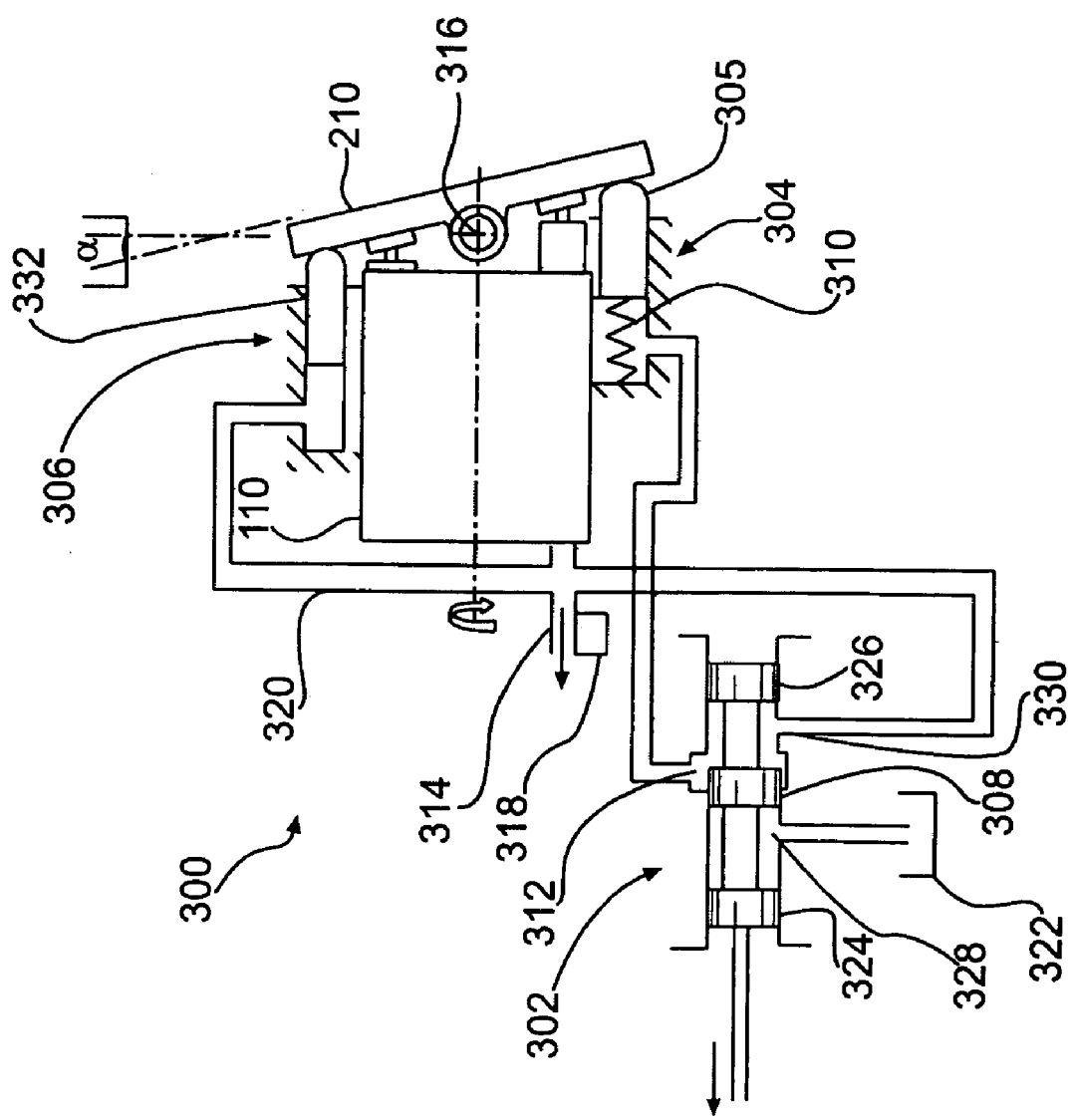
FIG. 3 illustrates a pump control mechanism consistent with an aspect of the present disclosure.

As spool 308 moves to the right in FIG. 3, however, the area of orifice 312 becomes smaller, and less fluid flows to control servo 304. Biasing servo 306 continues to receive fluid via channel 320 to thereby urge a biasing cylinder 332 to the right in FIG. 3, and push cylinder 305 to the left. Accordingly, swash plate 210 pivots about a pivot point 316, and angle α is reduced.

Spool 308 is coupled to a solenoid (not shown), having a rod which extends and retracts in a known manner in response to application of a solenoid current generated by control circuit 115. Thus, by application of an appropriate solenoid current, spool 308 is moved to a particular position, and thus the area of orifice 312 is adjusted to regulate fluid flow to servo 304. As a result, cylinder 305 is either extended or retracted, as the case may be, to set angle α. Swash plate 210 thus pivots about pivot point 316 to yield an appropriate output pressure and volume from pump 110.

As further shown in FIG. 3, a tank 322 is provided to take up any excess hydraulic fluid flowing out of servo valve 302 through an orifice 328. In addition, a conventional pump discharge pressure sensor 318, which may be located adjacent the pump output port 314, is adapted to sense the output pressure of the hydraulic fluid from pump 110. Alternatively, the pump output pressure sensor 318 may be located at any position suitable for sensing the pressure of the fluid from pump 110, such as at a point spaced from the pump 110.

Figure 4:
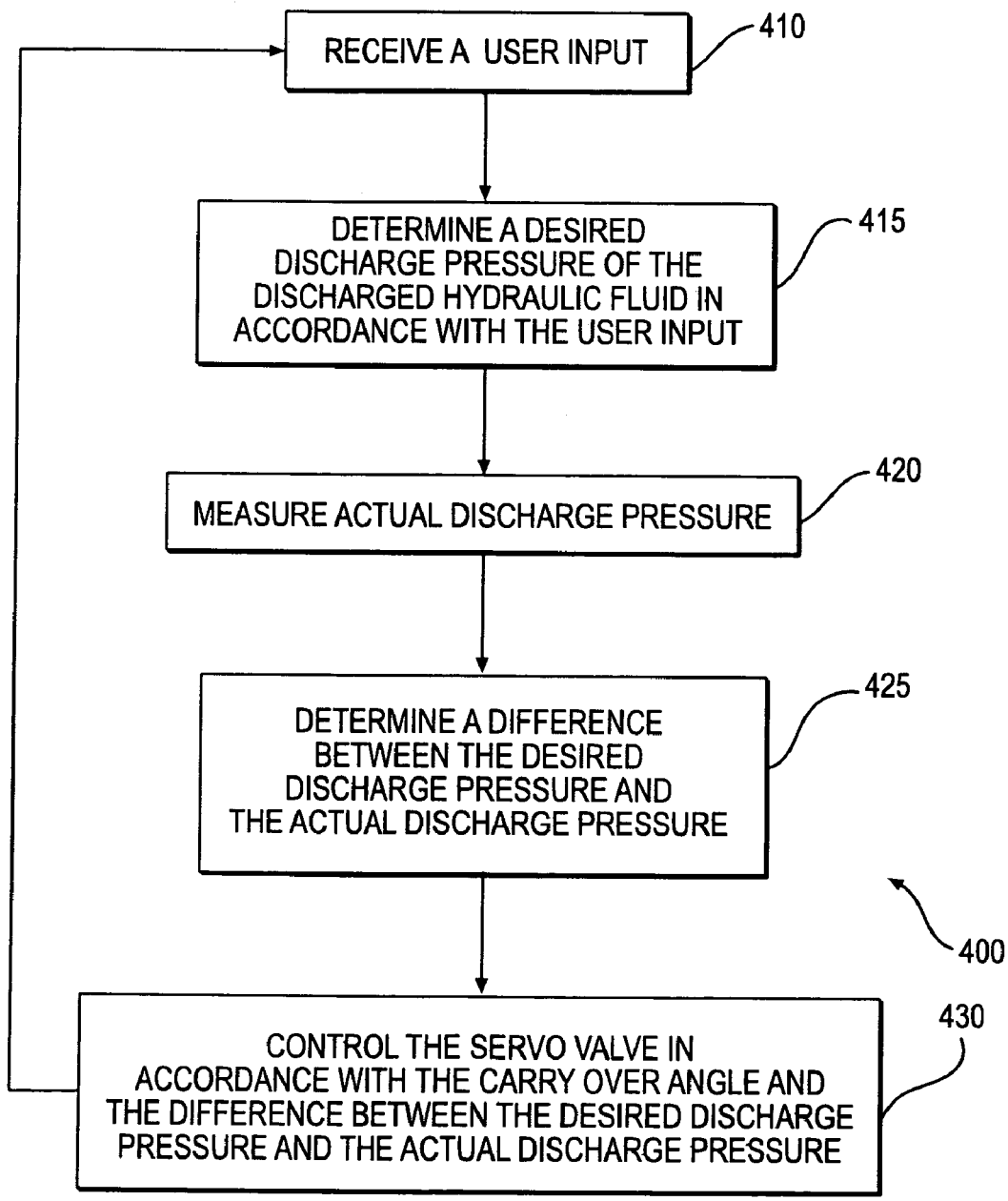
FIG. 4 illustrates a flow chart of a method consistent with a further aspect of the present disclosure.

A method of operating pump 110 will next be described with reference to flow chart 400 shown in FIG. 4. In step 410 of flow chart 400, control circuit 115 receives a user input, and determines a desired discharge pressure of the discharged hydraulic fluid in accordance with the user input (step 415). In step 420, the actual discharge pressure is measured, and corresponding data is supplied to control circuit 115. Based on this data and the desired discharge pressure, control circuit 115 determines a difference between the desired and actual discharge pressures (step 425). In accordance with the calculated difference and carry over angle γ, servo valve 302 is controlled by applying an appropriate solenoid current to adjust the position of spool 308, and thus the area of orifice 312 (step 430). The method then returns to step 410, a further user input is received by control circuit 115, and the remaining steps are repeated.

As noted above, changing orifice area results in changes in the amount of fluid supplied to servo 304 and corresponding changes in the angle of orientation α of swash plate 210. With angle α appropriately set, a desired output or discharge pressure of pump 110 can be achieved.

In particular, the orifice area $A_{vp}$ can be adjusted in accordance with:

$$A_{vp} = \frac{k_{pp}\Delta P_p + k_{dp}\Delta \dot{P}_p + A_{lc}\dot{\alpha}}{C(sgn(A_{vp}), \gamma)\sqrt{P_p}} \quad \text{Eq. 1}$$

where $k_{pp}$ is a constant associated with the actual discharge pressure,
where $k_{dp}$ is a constant associated with the desired discharge pressure,
$\Delta P_p$ is the difference between the desired discharge pressure and the actual discharge pressure,
$\Delta \dot{P}_p$ is a derivative with respect to time of the difference between the desired discharge pressure and the actual discharge pressure,
$A_{lc}$ is an area associated with the cylinder 305,
$\dot{\alpha}$ is a rate of change of the angle α of the swash plate 210,
$P_p$ is the actual discharge pressure, and $$C(sgn(A_{vp}), \gamma) = C_d k_{uc}\sqrt{\frac{1}{\rho}\left(1 + sgn(A_{vp})\left(1 - \frac{rnA_p\gamma}{\pi A_c L_c}\right)\right)} \quad \text{Eq. 2}$$

where $sgn(A_{vp})$ is a sign of a position of the servo valve spool 308,
γ is the pressure carry over angle,
$A_c$ is a sectional area of the servo valve 302,
$C_d$ is a coefficient associated with the orifice 312,
$k_{uc}$ is a constant,
$L_c$ is a distance from control servo 304 to the pivot point 316,
n is a number of the plurality of pistons 222,
r is a radius of a piston pitch circle, and
ρ is a density of the fluid.

The above formula, when satisfied, predicts stable operation of pump 110 so that a uniform discharge pressure can be obtained. The stability of pump 110 will next be described, along with an exemplary methodology for determining the desired discharge pressure.

Assuming l down stream orifices (operating valves) with load pressure $P_{li}$ respectively as the pump load, the pump discharge pressure dynamics can be expressed as:

$$P_p = \frac{\beta}{V_t}\left(D_p\omega\alpha - C_{hl}P_p - \sum_{i=1}^{l} C_d A_i sgn(P_p - P_{li})\sqrt{\frac{2}{\rho}|P_p - P_{li}|}\right) \quad \text{Eq. 3}$$

where β is the effective fluid bulk modulus, $A_i$, i=1, 2, ..., l, are the areas of the orifices, $D_p$ is the displacement constant of pump 110, ω is the pump running speed, $C_{hl}$ represents the leakage on the discharge side of the pump, $C_d$ is the operating valve orifice coefficient for each orifice, and $V_t$ is the discharge volume of pump 110. The desired pump discharge pressure $P_{d,p}$ is such selected that $$P_{d,p} > \max_i \{P_{li}\} \quad \text{Eq. 4}$$

$$\text{and } \left(sgn(P_p - P_{li})\sqrt{\frac{2}{\rho}|P_p - P_{li}|} + \sqrt{\frac{2}{\rho}(P_{d,p} - P_{li})}\right) > 0$$

Suppose that, with the desired pump discharge pressure $P_d$, the desired swash plate angle is $\alpha_d$.

Then the system error dynamics will be $$\left(C_{hl} + C_d \sum_i \frac{A_i}{sgn(P_p - P_{li})\sqrt{\frac{2}{\rho}|P - P_{li}|} + \sqrt{\frac{2}{\rho}(P_{d,p} - P_{li})}}\right) \quad \text{Eq. 4}$$

$$\Delta P + \frac{V_t}{\beta}\Delta \dot{P} = K_G \omega \Delta\alpha$$

By the above Equations (4) and (5), $$\left(C_{hl} + C_d \sum_i \frac{A_i}{\frac{sgn(P_p - P_{li})}{\sqrt{\frac{2}{\rho}(P_p - P_{li})} + \sqrt{\frac{2}{\rho}(P_{d,p} - P_{li})}}}\right) > 0 \quad \text{Eq. 6}$$

Then it can be concluded that, $\Delta\alpha \to 0$ as $\Delta P \to 0$ and $t \to \infty$. Here $\Delta P \to 0$ as $t \to \infty$ is guaranteed by Equation (1). It should be noted that with the Equations (1)–(3), the load flow is treated as the system disturbance and the pump is decoupled from the entire system, which makes velocity and position control of the cylinders independent from the pump control system.

Returning to FIG. 1, fluid output from pump 110, under a controlled pressure as discussed above, is supplied to valves, such as pressure reducing and operating valves 130. Control of hydraulic cylinder 125, as well as the structure and operation of these exemplary valves, will next be described with reference to FIGS. 5–7.

Figure 5:
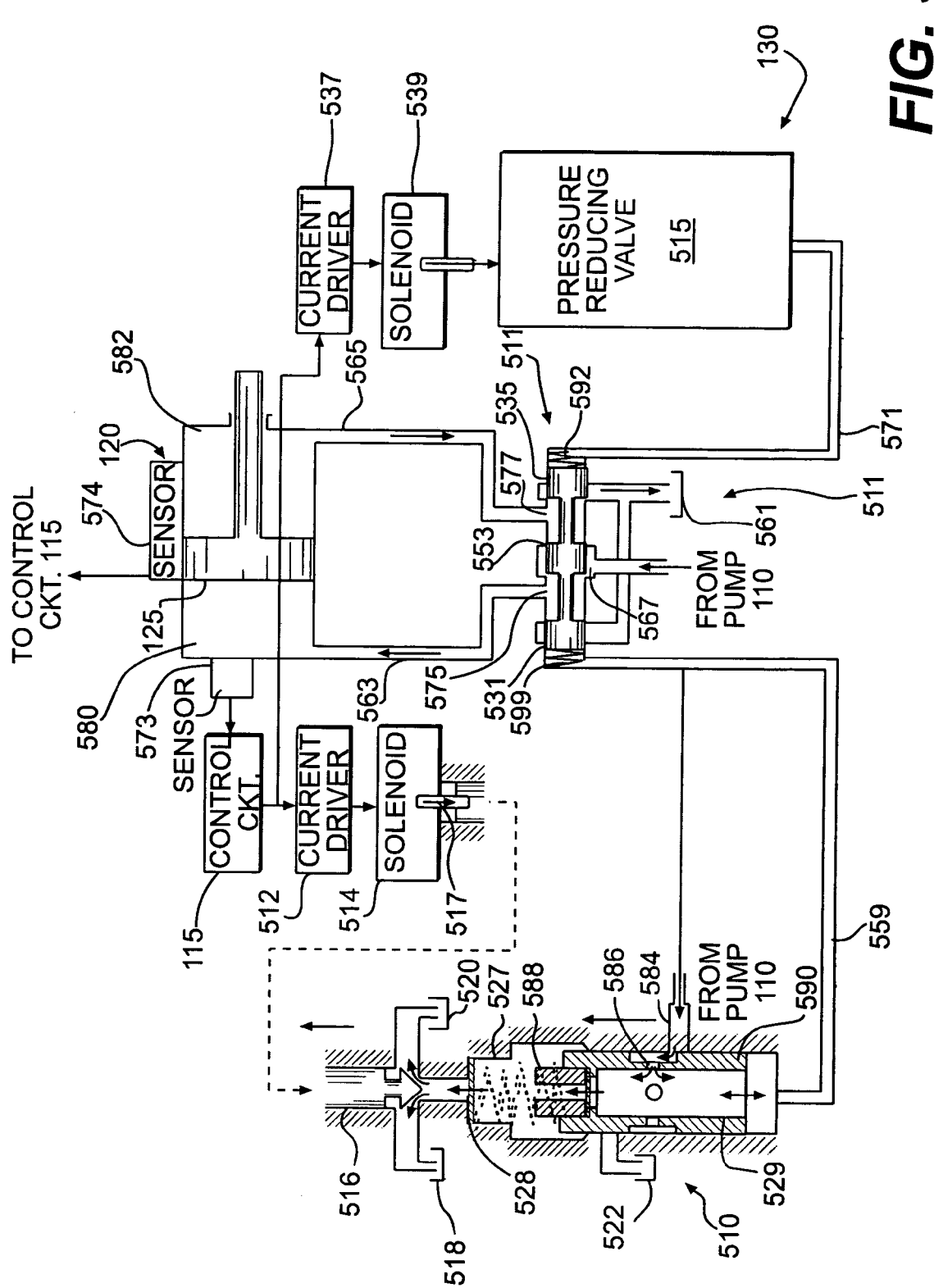
FIG. 5 illustrates detailed cross-sectional views of pressure reducing and operating valves shown in FIG. 1.
Figure 6:
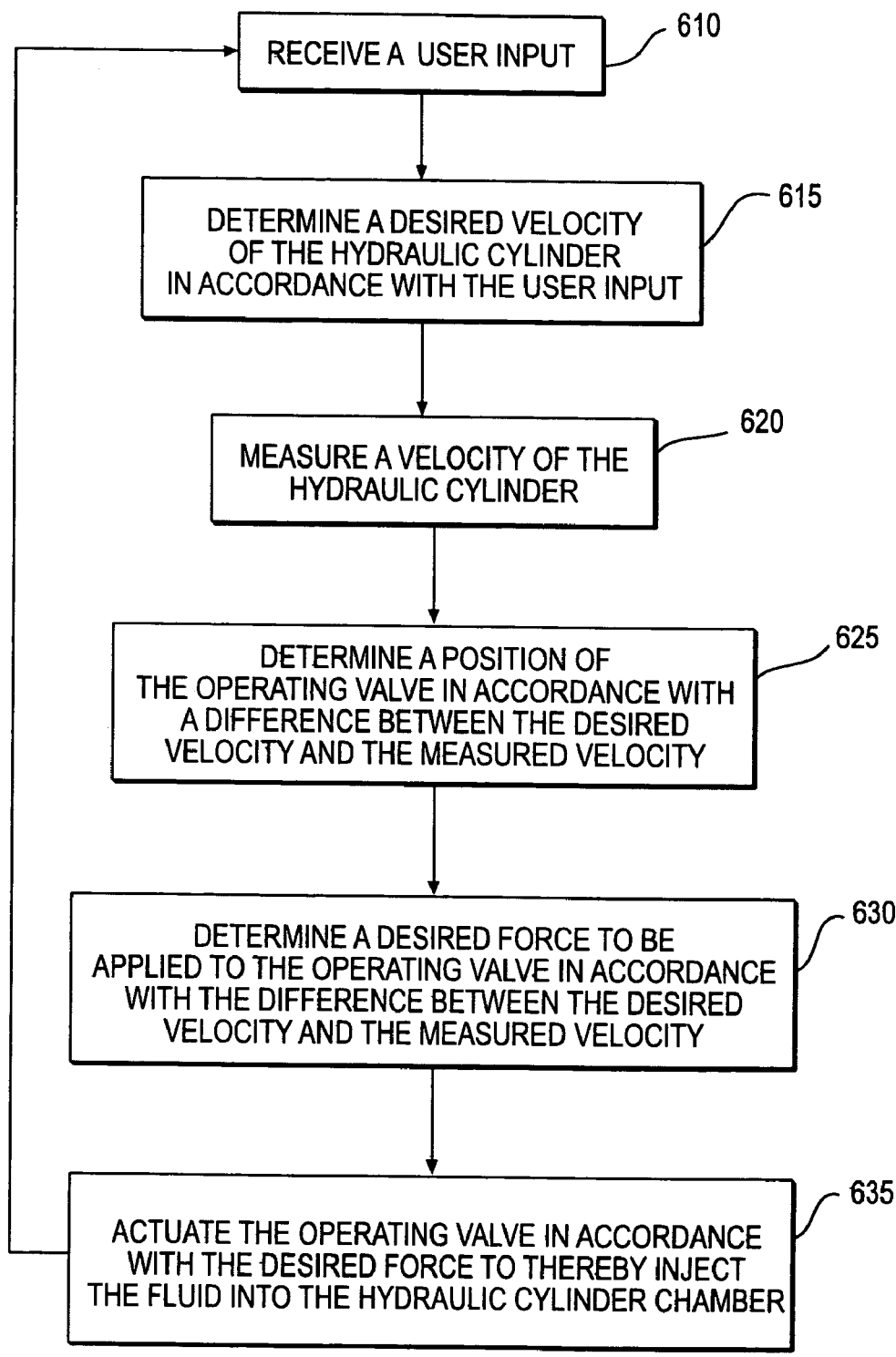
FIG. 6 illustrates a flow chart of a method in accordance with an additional aspect of the present disclosure.

FIG. 5 illustrates detailed cross-sectional views of operating valve 511, and pressure reducing valves 510 and 515 in block 130 of FIG. 1. Typically, the fluid pressure output from pump 110 is sufficiently high that a solenoid lacks sufficient force to adequately control operating valve 511. Accordingly, a mechanism for amplifying the solenoid force is provided which includes pressure reducing valves 510 and 515. One of pressure reducing valves 510 and 515 is activated at any given time to supply a force to either land 531 or 535, thereby shifting spool 533 to the right or left in FIG. 5. As a result, fluid is applied either to the head end portion 580 or shaft end portion 582 of chamber 120 to thereby shift cylinder 125 to the left or right in FIG. 5.

In particular, in the event force is applied through application of fluid pressure on line 559 by pressure reducing valve 510, land 531, spool 533 and land 535 are shifted together to the right in FIG. 5. Controlled pressure fluid from pump 110 thus flows through first and second valve orifices 567 and 575 to channel 563, which, in turn, supplies the fluid to head end portion 580 of chamber 120. Accordingly, cylinder 125 is shifted to the right, while fluid in shaft end portion 582 is discharged through channel 565. It is noted that centering springs 599 and 592 are optionally provided in order to properly position lands 531 and 535 and spool 533.

When pressure reducing valve 515 is activated, however, fluid pressure is applied to operating valve 511 through line 571 to shift lands 531 and 535, as well as spool 533 to the left in FIG. 5. Fluid from pump 110, therefore, flows through orifices 567 and 577 to shaft end portion 582 of chamber 120 via channel 565. Thus, cylinder 125 is shifted to the left in FIG. 5, while fluid is discharged from head end portion 580 through channel 563. As further shown in FIG. 5, tank 561 is provided to collect fluid expelled from either the head end or shaft end portions 580 and 582 during actuation of cylinder 125.

Pressure reducing valve 510 will next be described in greater detail with further reference to FIG. 5. Control circuit 115 is coupled to current driver 512, which supplies a solenoid drive current to solenoid 514. In response to the drive current, solenoid 512 is activated to extend piston 517 against spool 516, thereby urging spool 516 downward in FIG. 5. High pressure fluid flow is thus passed through opening 528 through chamber 527, including balancing spring 588, to urge slider valve 590 downward in FIG. 5. Such downward motion shifts opening 586 to overlap with inlet 584, thereby permitting relatively high pressure fluid from pump 110 to flow into chamber 529 and exert a pressure or force against land 531 via line 559.

As further shown in FIG. 5, tanks 518, 520 and 522 serve as reservoirs of fluid, and can receive any excess fluid present in pressure reducing valve 510.

Pressure reducing valve 515 includes similar components as pressure reducing valve 510, and acts in a similar fashion to exert a pressurized fluid on land 535 when control circuit 115 activates current driver 537 to supply a current to solenoid 539.

By appropriate application of solenoid currents with suitable magnitudes to solenoids 514 and 539, cylinder 125 can be moved to a desired location at a desired speed within chamber 120. A flow chart 600, illustrating a method for controlling the speed and position of cylinder 125, will next be described with reference to FIG. 6. In step 610 of flow chart 600, control circuit 115 receives the user input, and in step 615 control circuit 115 determines a desired velocity of the hydraulic cylinder 125 in accordance with the user input. The velocity of cylinder 125 is measured by a sensor 573, which outputs a signal indicative of the cylinder velocity to control circuit 115 (step 620). Sensor 573 may also detect the position of hydraulic cylinder 125, or an additional position detecting sensor 574 may be provided. Control circuit 115, in turn, determines a position of the operating valve in accordance with the desired velocity and the measured velocity (step 625).

In particular, the valve position, $x_v$ is calculated by control circuit 115 in accordance with:

$$x_v = \frac{k_{xvs}}{\sqrt{P_p(t) - P_l(t)}}(\dot{x}_{cy,d} - \dot{x}_{cy}) \quad \text{Eq. 7}$$

where
$k_{xvs}$ is a gain parameter,
$P_p(t)$ is the pressure of the fluid supplied to the operating valve 511,
$P_l(t)$ is a load pressure associated with the operating valve 511 and the hydraulic cylinder 125,
$\dot{x}_{cy,d}$ is the desired velocity of hydraulic cylinder 125, and
$\dot{x}_{cy}$ is the measured velocity of the hydraulic cylinder 125.

A derivation of Equation 7 will next be described. Compared with the bandwidth of cylinder 125, the dynamics of pressure-reducing valves 510 and 515 can be neglected and the control design for cylinder 125 can be simplified. In particular, neglecting the leakage inside chamber 120, at any operating position, the linearized cylinder dynamics can be expressed in Laplace domain as $$\left(m_{cy}s^2 + c_{cy}s + \left(k_c + \frac{\beta A_h^2}{V_h(x_o)} - \frac{\beta A_r^2}{V_r(x_o)}\right)\right)X_{cy}(s) = \frac{\beta A_h Q_{in}(s)}{V_h(x_o)s} - D(s) \quad \text{Eq. 8}$$

where variable $X_{cy}(s)$ represents the position of cylinder 125, variable $Q_{in}(s)$ is the control flow rate, variable $D(s)$ is the disturbance term including load force and return pressure effects, $x_o$ is the operating position of cylinder 125, $V_h$ and $V_r$ are the volumes of the head end and rod end of cylinder 125, respectively, $c_{cy}$ is a viscous damping constant, $A_h$ and $A_r$ are the actuator areas of cylinder 125 at head end and rod end respectively, and $k_c$ is an equivalent spring constant.

Using negative speed feedback, i.e. $Q_{in}(s) = -k_s s X_{cy}(s)$, such that $$k_c + \frac{\beta A_h^2}{V_h(x_o)} - \frac{\beta A_r^2}{V_r(x_o)} + \frac{k_s \beta A_h}{V_h(x_o)} > 0 \quad \text{Eq. 9}$$

The stability closed loop control system will be guaranteed and the speed tracking error will be bounded so long as $c_{cy}>0$, which will be the case for any cylinder. Accordingly, the flow rate of fluid flowing from operating valve 511 to chamber 120, can be converted into operating valve position using the following equation $$A_o(x_v) = \frac{Q_{in}}{C_d}\sqrt{\frac{\rho}{2(P_p - P_l)}} = \frac{K}{\sqrt{P_p - P_l}} Q_{in} \qquad \text{Eq. 10}$$

Further, feedback control law can be written in time domain as $$A_o(x_v) = \frac{k_{Aos}}{\sqrt{P_p(t) - P_l(t)}}(\dot{x}_{cy,d} - \dot{x}_{cy}) \qquad \text{Eq. 11}$$

Equation 11 yields the desired area of orifice 575, for example, and the desired operating valve position $x_v$ can be calculated or mapped from the geometric configuration of operating valve 511. Without losing generality, a linear relation between the area of orifice 575 and valve position is assumed (nonlinear case can be easily generated) and Equation 11 becomes Equation 7 noted above, namely $$x_v = \frac{k_{xvs}}{\sqrt{P_p(t) - P_l(t)}}(\dot{x}_{cy,d} - \dot{x}_{cy})$$

Returning to FIG. 6, in step 630, the force to be applied to operating valve 511 is determined based on the position of cylinder 125, $x_v$, in accordance with $$(k_v + k_{vf1}(P_p - P_l) + k_{vf2}P_r)x_v(t) = F(t) \qquad \text{Eq. 12}$$

where $k_v$ is the spring constant associated with centering springs 599 and 592 in FIG. 5, and $k_{vf1}$ and $k_{vf2}$ are the coefficients of the steady state flow forces for the valve metering orifices 567, 575 and 577. In arriving at Equation 12, the dynamics of operating valve 511 are assumed to be faster than that of the cylinder 125 and the operating valve 511 instantaneously reaches its equilibrium. Alternatively, substituting Equation 7 in Equation 12, F(t) can be expressed as $$F(t) = \qquad \text{Eq. 13}$$
$$k_{xvs}\left(\frac{k_v}{\sqrt{P_p(t) - P_l(t)}} + k_{vf1}\sqrt{P_p(t) - P_l(t)} + \frac{k_{vf2}P_r}{\sqrt{P_p(t) - P_l(t)}}\right)$$
$$(\dot{x}_{cy,d} - \dot{x}_{cy})$$

In step 635, operating valve 511 is actuated by applying appropriate solenoid valve currents to solenoids 514 and 539, so that the desired force is supplied to operating valve 511. As a result, fluid is injected into chamber 120, as further discussed above, and hydraulic cylinder 125 is moved by a desired amount and with a desired velocity.

Thus, by determining the difference between the desired cylinder velocity and actual cylinder velocity, both the position of operating valve 511 (e.g., the placement of spool 533) and the force to be applied to operating valve 511 can be obtained.

Figure 9:
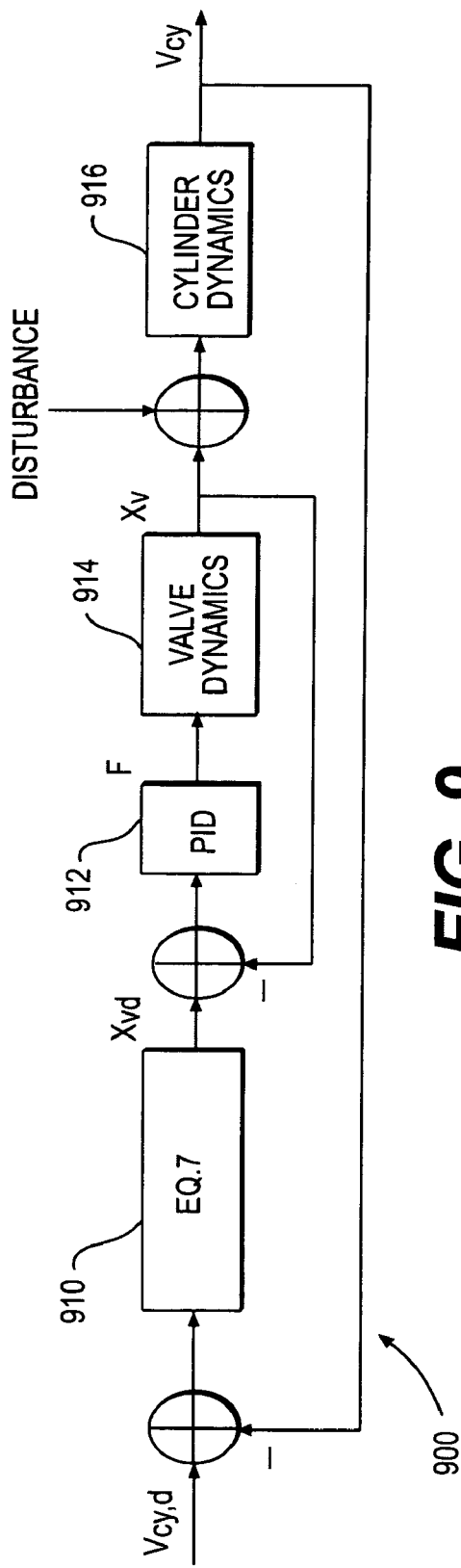
FIG. 9 illustrates a computational flow in accordance with a further aspect of the disclosure.

In Equations 12 and 13, for example, an integration term with very small gain can be added to eliminate any steady state tracking error, if necessary. If the dynamics of operating valve 511 are considerably slow, an observer may be designed to estimate the position of valve 511 (or the valve position can be measured if required) and Equation 7 can be treated as the desired valve position. Control circuit 115 can then control and track the trajectory of valve 511 based on a further equation, such as a conventional proportional integral derivative (PID) formula. The PID formula can be incorporated into a computational flow 900 for determining the cylinder velocity $v_{cy}$, as shown in FIG. 9.

In computational flow 900, the difference between the desired velocity $v_{cy,d}$ and the measured velocity $v_{cy}$ of cylinder 125 is determined by control circuit 115, and then, as represented by block 910, Equation 7 is used to calculate a valve position. The valve position is assigned the desired valve position $x_{v,d}$. As indicated by block 912, a desired force is calculated by control circuit 115 based on a PID formula and a difference between the desired valve position $x_{v,d}$ and actual valve position $x_v$. The force is applied to valve 511 (block 914), and any variation due to vibrations, for example, or other disturbances are assumed to alter the valve position. Nevertheless, fluid flows through valve 511 to actuate cylinder 125, as discussed above (block 916). The resulting cylinder velocity $v_{cy}$ is measured, and fed back as an input to computational flow 900, and computational flow 900 is repeated.

Figure 7:
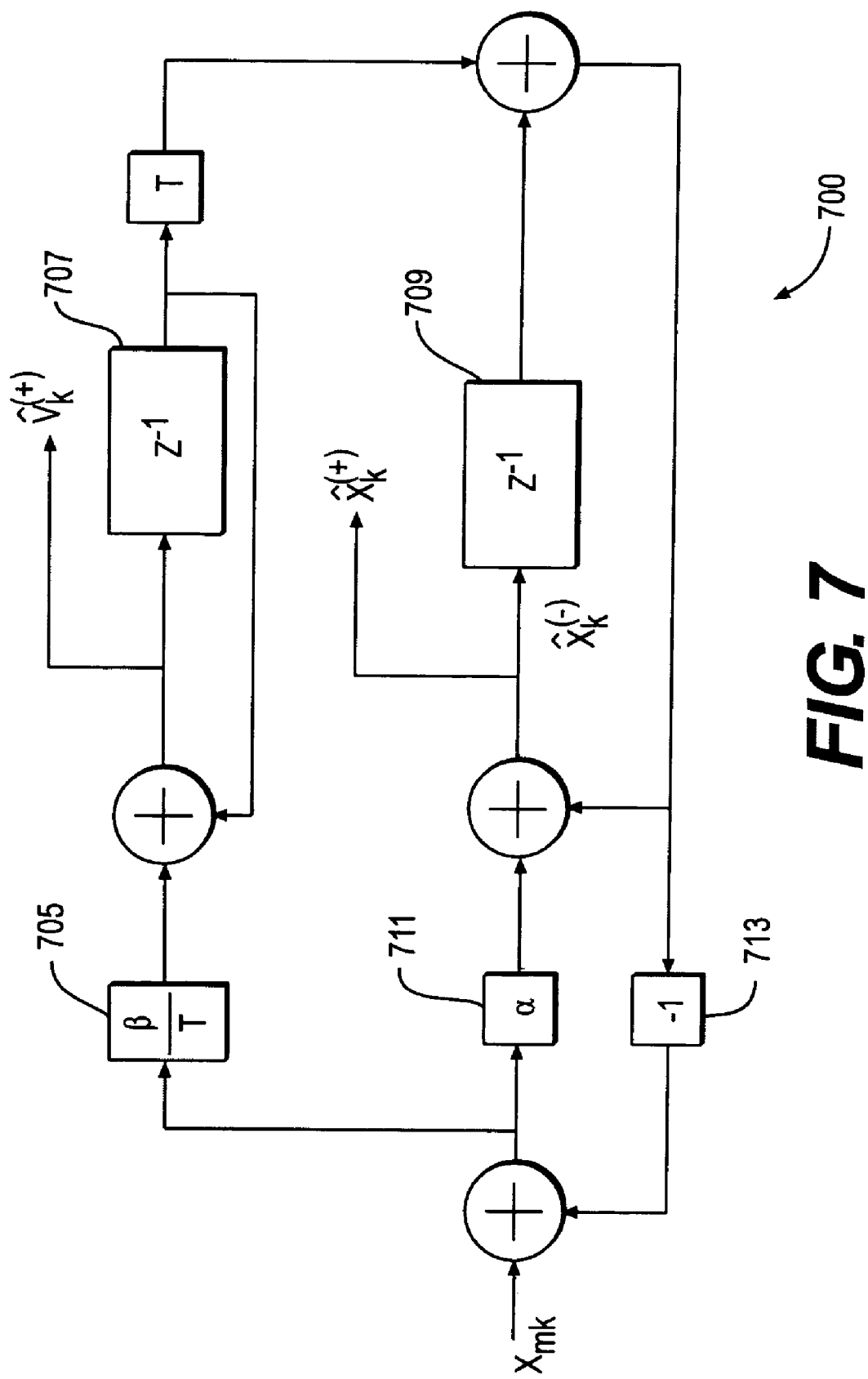
FIG. 7 illustrates a computational flow consistent with a further aspect of the present disclosure.

Turning to FIG. 7, estimation of the velocity of cylinder 125 will next be described with reference to the computational flow 700. In the figure, a plurality of position values $x_k$ of valve 511 are obtained, and are used to estimate the desired velocity. The following parameters may also be used in computation flow 700 to estimate the position and velocity of hydraulic cylinder 125, wherein $x_k$ is the current position (at time k), $v_k$ is the current velocity (at time k), $\hat{x}_k^{(+)}$ is the estimation of $x_k$ based on all measurements up to and including $x_{m_k}$, $\hat{s}_k^{(+)}$ is the estimate of $v_k$ based on all measurements up to and including $x_{m_k}$, $\hat{x}_k^{(-)}$ is the estimation of $x_k$ based on all measurements up to and including $x_{m_{k-1}}$, T is the data sampling frequency, and $\alpha$ and $\beta$ are appropriate constants.

In FIG. 7, block 705 represents that the input thereto is multiplied by the quantity $\beta/T$, and the term $z^{-1}$ in blocks 707 and 709 represents a delay. Block 713 represents that the input thereto is multiplied by a suitable gain factor, and block 711 represents multiplication by the constant $\alpha$ (not to be confused with the angle of inclination of swash plate 210 discussed above). The outputs of computational flow 700 are the estimated velocity $\hat{v}_k^{(+)}$ at time k, and the estimated position $\hat{x}_k^{(+)}$ of hydraulic cylinder 125.

With the measurements of the positions of hydraulic cylinder 125, operating pressures, and the swash plate angle $\alpha$, errors can be tracked and used to design adaptive laws for online learning and compensation for system uncertainties. Parameter identification and component working status monitoring become easier as well. For example, uncertainties of the pump control valves, such as servo valve 302, can be accounted for with fluid flow algorithms in a stable convergent learning process. For example, the desired area of orifice 312, $A_{vp}$ can be modified as follows to compensate for such uncertainties:

$$v_c(t) = v_0 - \hat{\delta}_0 + \frac{k_{pp}\Delta P_p + k_{dp}\Delta \dot{P}_p + A_{lc}\dot{\alpha}}{C(sgn(A_{vp}),\gamma)\sqrt{P_p}} \quad \text{Eq. 14}$$

$$\dot{\hat{\delta}}_0 = \eta \Delta P_p \sqrt{P_p} \quad \text{Eq. 15}$$

where $\hat{\delta}_0$ represents the estimated control valve command bias voltage $\delta_0$. Since $\sqrt{P_p}$ is bounded, it can be obtained that $\Delta P(t) \to 0$ and $(\delta_0 - \hat{\delta}_0) \to 0$ as $t \to \infty$. Accordingly, uncertainties in solenoid mapping constant, in bias spring rate, in steady state flow force, can be captured and compensated automatically without any routine calibration of pump 110.

Figure 8:
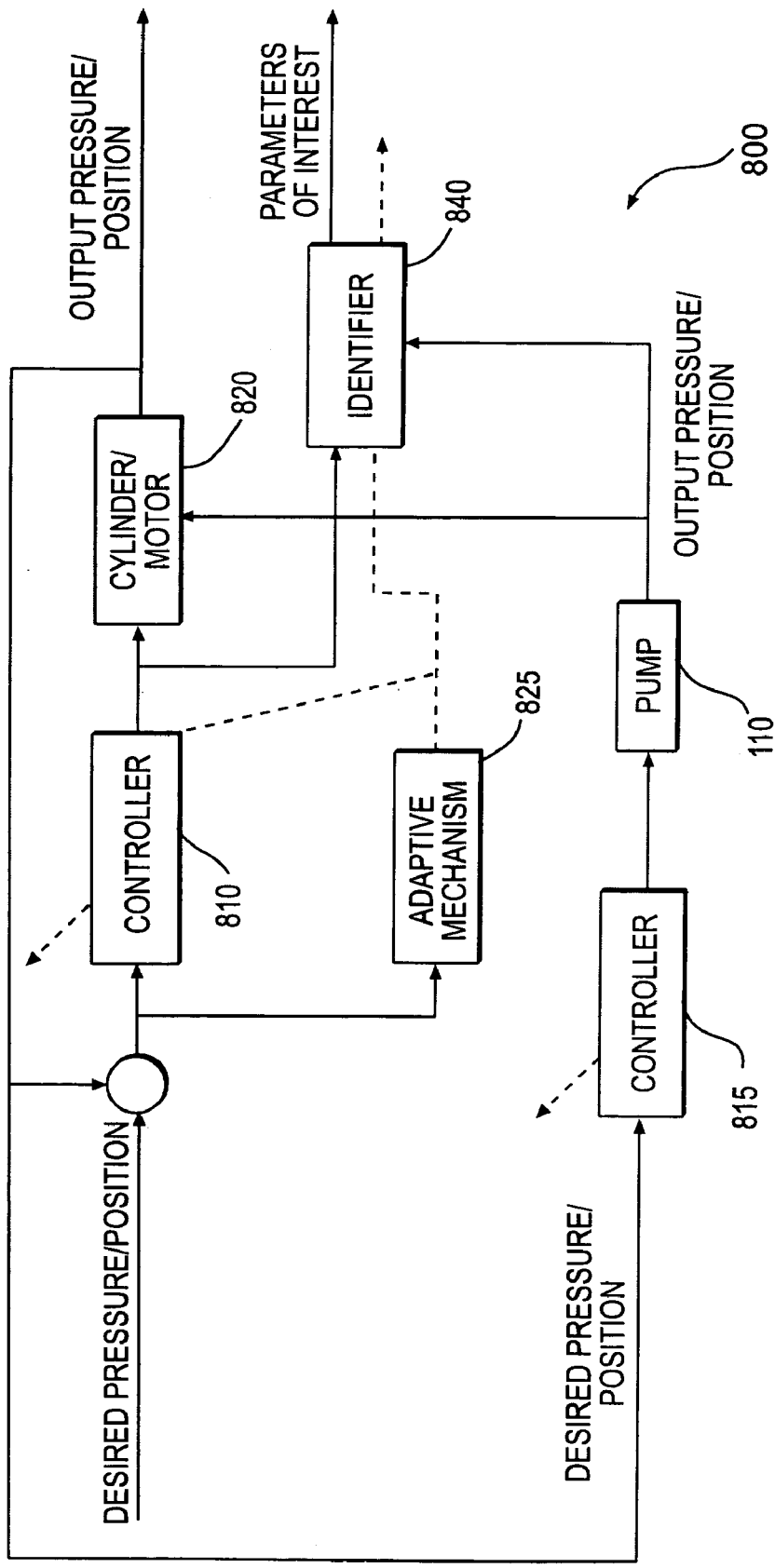
FIG. 8 illustrates a schematic block diagram of a control system consistent with another aspect of the present disclosure.

FIG. 8 illustrates a block diagram 800 of a general architecture for adaptive control design. In block diagram 800, controller blocks 810 and 815 represent routines carried by control circuit 115 for controlling cylinder 125 (or alternatively a hydraulic motor 145) represented by block 820, and pump 110, respectively. Block 840 represents a desired identifier value or parameter of interest, and adaptive mechanism block 825 represents a routine or other software or appropriate hardware that determines an appropriate output pressure and/or position of cylinder 125 or motor 145 that yields parameters of interest with desired values.

By way of example, adaptive mechanism block 825 may include a routine for reducing energy consumption by system 100 by operating cylinder 125 at certain positions and speeds. Controller blocks 810 and 815 can cooperate to control cylinder 125 (represented by block 820) and pump 110 to conform to the operating parameters determined by adaptive mechanism block 825. The resulting output pressure, position, and speed values of cylinder 125 are then fed back to adaptive mechanism block 825, as well as user inputs defining desired pressures and positions. The adaptive mechanism block 825 can then output suitable information to controller blocks 810 and 815 to maintain feedback control of cylinder 125 and pump 110.

A generic form of the adaptive mechanism can be expressed by a known formula:

$$J = \int \{x^T Q x + u^T R u\} dt \quad \text{Eq. 16}$$

where x is the state vector, u is the control input vector, Q and R are the weighting matrices, and J is the optimized parameter. As a special case, specific control of cylinder 125 can be expressed as:

$$J = \int \{\rho_1 P_l^2(t) + \rho_2 x_{cy}^2(t)\} dt \quad \text{Eq. 17}$$

where $P_l$ is the cylinder load pressure, $x_{cy}$ is the cylinder displacement, and $\rho_1$ and $\rho_2$ are positive constants. Suitable parameters can be optimized in accordance with the above formula.

INDUSTRIAL APPLICABILITY

A hydraulic cylinder is provided that is actuated by fluid output from a pump. Unlike conventional control mechanisms, which rely on calibrated pumps and pressure tables that associate pump pressures with corresponding cylinder positions and velocities, the hydraulic system of the present disclosure controls the hydraulic cylinder in accordance with a difference between a desired and measured hydraulic cylinder velocities. Accordingly, the hydraulic cylinder is controlled independently of the pump, and precise and efficient control of the hydraulic cylinder can be obtained. Optimization routines based on accurate knowledge of hydraulic cylinder parameters can thus be realized.

Further consistent with the present disclosure, hydraulic cylinder velocity valves are fed back to control circuit 115 to control cylinder movement in a closed loop ionization. Compared to conventional open loop control schemes relying on pump data tables, the control method consistent with the present disclosure has greater stability and is less sensitive to variations in individual components of the system. Thus, manufacturing requirements can be relaxed, and costs reduced.

The present disclosure is applicable to working tools and machines based on structural dynamics. Moreover, linear mapping or correspondence between the user input, such as a joystick control, and the velocity command in the form of solenoid currents, can be simplified.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A method for controlling a hydraulic cylinder, the hydraulic cylinder being provided with a chamber and configured to receive fluid from a valve, the method comprising:
   receiving a user input;
   determining a desired velocity of the hydraulic cylinder in accordance with the user input;
   measuring a velocity of the hydraulic cylinder;
   determining a desired force to be applied to the valve in accordance with a difference between the desired velocity of the hydraulic cylinder and the measured velocity of the hydraulic cylinder; and
   actuating the valve in accordance with the desired force to thereby inject the fluid into the chamber and move the hydraulic cylinder.

2. A method in accordance with claim 1, wherein the determining the desired force to be applied to the valve is further in accordance with a pressure of the fluid supplied to the valve from a pump.

3. A method in accordance with claim 1, further including determining a position of the valve in accordance with the difference between the desired velocity of the hydraulic cylinder and the measured velocity of the hydraulic cylinder.

4. A method in accordance with claim 3, wherein determining the position of the valve, $x_v$, is in accordance with:

$$x_v = \frac{k_{xvs}}{\sqrt{P_p(t) - P_l(t)}} (\dot{x}_{cy,d} - \dot{x}_{cy})$$

$k_{xvs}$ is a gain parameter,
$P_p(t)$ is the pressure of the fluid supplied to the valve,
$P_l(t)$ is a load pressure associated with the valve and the hydraulic cylinder,
$\hat{\dot{x}}_{cy,d}$ is the desired velocity of the hydraulic cylinder, and
$\hat{\dot{x}}_{cy}$ is the measured velocity of the hydraulic cylinder.

5. A method in accordance with claim 4, wherein the valve has first and second orifices, the determining the desired force F(t) to be applied to the valve is in accordance with:

$$F(t) = k_{xvs}\left(\frac{k_v}{\sqrt{P_p(t) - P_l(t)}} + k_{vf1}\sqrt{P_p(t) - P_l(t)} + \frac{k_{vf2}P_r}{\sqrt{P_p(t) - P_l(t)}}\right)(\dot{x}_{cy,d} - \dot{x}_{cy})$$

where $k_v$ is a spring constant of a spring provided in the valve, $k_{vf1}$ is a coefficient of a steady state flow force associated with the first valve orifice, and $k_{vf2}$ is a coefficient of a steady state flow force associated with the second valve orifice.

6. A method in accordance with claim 1, further including:
measuring a plurality of position values of the hydraulic cylinder, wherein the determining the desired velocity includes estimating the desired velocity based on the measured plurality of position values.

7. A method for controlling a hydraulic cylinder, the hydraulic cylinder being provided with a chamber, the method comprising:
receiving an input from a user;
supplying fluid from a pump to a first valve in response to the input from the user; and
regulating application of the fluid to the hydraulic cylinder with the first valve,
wherein the pump includes a swash plate configured to pivot about a pivot point, the swash plate being coupled to a second valve, the supplying fluid includes:
determining a desired pressure of the fluid at a location adjacent an output port of the pump in accordance with the user input;
measuring the actual pressure of the fluid at the location adjacent the output of the pump;
determining a difference between the desired pressure and the actual pressure; and
controlling the second valve in accordance with the difference between the desired pressure and the actual pressure to adjust the angle of the swash plate, and
wherein the regulating the application of the fluid includes:
determining a desired velocity of the hydraulic cylinder in accordance with the user input;
determining a desired force to be applied to the first valve in accordance with a difference between the desired velocity of the hydraulic cylinder and a measured velocity of the hydraulic cylinder; and
actuating the first valve in accordance with the desired force to thereby inject the fluid into the chamber and move the hydraulic cylinder.

8. A method in accordance with claim 7, wherein the pump includes a valve plate, the valve plate being configured to receive the fluid through an intake port, and output the fluid with the actual pressure through the output port, the valve plate having a pressure change region delineated by a pressure carry over angle, the controlling the second valve being further in accordance with the pressure carry over angle.

9. A method in accordance with claim 7, further including actuating a position of the swash plate with a control servo, the actuating being in response to the controlling the second valve.

10. A method in accordance with claim 9, wherein the hydraulic cylinder is a first cylinder, the control servo includes a second cylinder, the second valve includes an orifice, an area of the orifice being $A_{vp}$, and the pump includes a plurality of pistons configured to receive the fluid through an intake port, and discharge the fluid through the output port, and the controlling the second valve includes adjusting the area of the orifice $A_{vp}$ in accordance with:

$$A_{vp} = \frac{k_{pp}\Delta P_p + k_{dp}\Delta \dot{P}_p + A_{lc}\dot{\alpha}}{C(sgn(A_{vp}), \gamma)\sqrt{P_p}}$$

where $k_{pp}$ is a constant associated with the actual pressure,
where $k_{dp}$ is a constant associated with the desired pressure, $\Delta P_p$ is the difference between the desired pressure and the actual pressure, $\Delta \dot{P}_p$ is a derivative with respect to time of the difference between the desired pressure and the actual pressure, $A_{lc}$ is an area associated with the second cylinder, $\dot{\alpha}$ is a rate of change of the angle of the swash plate, $P_p$ is the actual pressure, and $$C(sgn(A_{vp}), \gamma) = C_d k_{uc}\sqrt{\frac{1}{\rho}\left(1 + sgn(A_{vp})\left(1 - \frac{rnA_p\gamma}{\pi A_c L_c}\right)\right)}$$

where $sgn(A_{vp})$ is a sign of a position of the second valve,
$\gamma$ is the pressure carry over angle,
$A_c$ is a sectional area of the second valve,
$C_d$ is a coefficient associated with the orifice,
$k_{uc}$ is a constant
$L_c$ is a distance from control servo to the pivot point,
n is a number of the plurality of pistons,
r is a radius of a piston pitch circle, and
$\rho$ is a density of the fluid.

11. A method in accordance with claim 7, further including diverting a portion of the discharged fluid to a biasing servo, the biasing servo being operable to decrease the angle of the swash plate, and the control servo being operable to increase the angle of the swash plate.

12. A method in accordance with claim 7, further including determining a position of the first valve in accordance with the actual pressure of the fluid.

13. A method in accordance with claim 7, wherein the determining the desired position of the valve is further in accordance with a difference between the desired velocity of the hydraulic cylinder and the measured velocity of the hydraulic cylinder.

14. A method in accordance with claim 13, wherein determining the position of the first valve, $x_v$, is in accordance with:

$$x_v = \frac{k_{xvs}}{\sqrt{P_p(t) - P_l(t)}}(\dot{x}_{cy,d} - \dot{x}_{cy})$$

$k_{xvs}$ is a gain parameter,
$P_p(t)$ is an actual pressure of the fluid,
$P_l(t)$ is a load pressure associated with the first valve and the hydraulic cylinder,
$\dot{x}_{cy,d}$ is the desired velocity of the hydraulic cylinder, and
$\dot{x}_{cy}$ is the measured velocity of the hydraulic cylinder.

15. A method in accordance with claim 14, wherein the first valve has first and second orifices, the determining the desired force F(t) to be applied to the valve is in accordance with:

$$F(t) = k_{xvs}\left(\frac{k_v}{\sqrt{P_p(t)-P_l(t)}} + k_{vf1}\sqrt{P_p(t)-P_l(t)} + \frac{k_{vf2}P_r}{\sqrt{P_p(t)-P_l(t)}}\right)(\dot{x}_{cy,d}-\dot{x}_{cy})$$

where $k_v$ is a spring constant associated a spring provided in the first valve,
$k_{vf1}$ is a coefficient of a steady state flow force associated with the first valve orifice, and
$k_{vf2}$ is a coefficient of a steady state flow force associated with the second valve orifice.

16. A method in accordance with claim 7, further including:
measuring a plurality of position values of the hydraulic cylinder, wherein the determining the desired velocity includes estimating the desired velocity based on the measured plurality of position values.

17. A hydraulic system including:
a hydraulic cylinder provided with a chamber;
a valve, the hydraulic cylinder being configured to receive fluid from the valve and output fluid to the valve;
a sensor coupled to the hydraulic cylinder, the sensor being configured to measure a velocity of the hydraulic cylinder; and
a control circuit coupled to the sensor and the valve, the control circuit being configured to receive a user input, determine a desired velocity of the hydraulic cylinder in accordance with the user input, determine a desired force to be applied to the valve in accordance with a difference between the desired velocity of the hydraulic cylinder and a measured velocity of the hydraulic cylinder, and control actuation of the valve in accordance with the desired force such that the fluid is injected into the chamber to thereby move the hydraulic cylinder.

18. A hydraulic system in accordance with claim 17, further including a pump, the pump being configured to supply the fluid to the valve, wherein the control circuit is further configured to determine a position of the valve in accordance with a value of pressure of the fluid supplied from the pump.

19. A hydraulic system in accordance with claim 17, wherein the control circuit is further configured to determine the position of the valve in accordance with the difference between the velocity of the hydraulic cylinder and the measured velocity of the hydraulic cylinder.

20. A hydraulic system in accordance with claim 17, wherein the control circuit is configured to determine the desired position $x_v$ of the valve in accordance with:

$$x_v = \frac{k_{xvs}}{\sqrt{P_p(t)-P_l(t)}}(\dot{x}_{cy,d}-\dot{x}_{cy})$$

$k_{xvs}$ is a gain parameter,
$P_p(t)$ is a pressure of the fluid supplied to the valve,
$P_l(t)$ is a load pressure associated with the valve and the hydraulic cylinder,
$\dot{x}_{cy,d}$ is the desired velocity of the hydraulic cylinder, and
$\dot{x}_{cy}$ is the measured velocity of the hydraulic cylinder.

21. A hydraulic system in accordance with claim 20, wherein the valve has first and second orifices, and the control circuit is further configured to determine the desired force F(t) to be applied to the valve in accordance with:

$$F(t) = k_{xvs}\left(\frac{k_v}{\sqrt{P_p(t)-P_l(t)}} + k_{vf1}\sqrt{P_p(t)-P_l(t)} + \frac{k_{vf2}P_r}{\sqrt{P_p(t)-P_l(t)}}\right)(\dot{x}_{cy,d}-\dot{x}_{cy})$$

where $k_v$ is a spring constant associated with a spring included in the valve,
$k_{vf1}$ is a coefficient of a steady state flow force associated with the first valve orifice, and
$k_{vf2}$ is a coefficient of a steady state flow force associated with the second valve orifice.

22. A hydraulic system in accordance with claim 17, wherein the sensor is further configured to measure a plurality of positions of the hydraulic cylinder, and the control circuit is configured to estimate the desired velocity of the hydraulic cylinder based on the measured plurality of positions.

23. A hydraulic system, comprising:
a hydraulic cylinder, the hydraulic cylinder being provided with a chamber;
a first sensor coupled to the hydraulic cylinder, the first sensor being configured to measure a velocity of the hydraulic cylinder;
a first valve configured to apply the fluid to the hydraulic cylinder;
a pump, the pump being configured to supply the fluid to the first valve, the pump including a swash plate configured to pivot about a pivot point;
a second valve, the swash plate being coupled to the second valve;
a second sensor configured to measure an actual pressure of the fluid at a location adjacent an output of the pump; and
a control circuit coupled to the first and second sensors and the first and second valves, the control circuit being configured to receive an input from a user and determine a desired pressure of the fluid at the location adjacent the output port of the pump in accordance with the user input, determine a difference between the desired pressure and the actual pressure, control the second valve in accordance with the difference between the desired pressure and the actual pressure to adjust the angle of the swash plate, determine a desired velocity of the hydraulic cylinder in accordance with the user input, determine a desired force to be applied to the first valve in accordance with the desired velocity of the hydraulic cylinder and a measured velocity of the hydraulic cylinder, and control actuation of the first valve in accordance with the desired force to thereby inject the fluid into the chamber and move the hydraulic cylinder.

24. A hydraulic system in accordance with claim 23, wherein the pump includes a valve plate, the valve plate being configured to receive the fluid through an intake port, and output the fluid with the actual pressure through the output port, the valve plate having a pressure change region delineated by a pressure carry over angle, the controlling the second valve being further in accordance with the carry over angle.

25. A hydraulic system in accordance with claim 24, wherein the control servo includes a first cylinder, the servo valve includes an orifice, an area of the orifice being $A_{vp}$, and the pump includes a plurality of pistons configured to receive fluid through the intake port, and discharge the fluid through the output port, and the control circuit is further configured to control the servo valve by adjusting the area of the orifice $A_{vp}$ in accordance with:

$$A_{vp} = \frac{k_{pp}\Delta P_p + k_{dp}\Delta \dot{P}_p + A_{lc}\dot{\alpha}}{C(sgn(A_{vp}),\gamma)\sqrt{P_p}}$$

where $k_{pp}$ is a constant associated with the actual pressure,
where $k_{dp}$ is a constant associated with the desired pressure,
$\Delta P_p$ is the difference between the desired pressure and the actual pressure,
$\Delta \dot{P}_p$ is the derivative with respect to time of the difference between the desired pressure and the actual pressure,
$A_{lc}$ is an area associated with the cylinder,
$\dot{\alpha}$ is a rate of change of the angle of the swash plate,
$P_p$ is the actual pressure, and $$C(sgn(A_{vp}),\gamma) = C_d k_{uc}\sqrt{\frac{1}{\rho}\left(1 + sgn(A_{vp})\left(1 - \frac{rnA_p\gamma}{\pi A_c L_c}\right)\right)}$$

where $sgn(A_{vp})$ is a sign of a position of the servo valve,
$\gamma$ is the pressure carry over angle,
$A_c$ is a sectional area of the servo valve,
$C_d$ is a coefficient associated with the orifice,
$k_{uc}$ is a constant
$L_c$ is a distance from control servo to the pivot point,
n is a number of the plurality of pistons,
r is a radius of a piston pitch circle, and
$\rho$ is a density of the fluid.

26. A hydraulic system in accordance with claim 23, wherein the control circuit is further configured to determine a position $x_v$ of the first valve in accordance with:

$$x_v = \frac{k_{xvs}}{\sqrt{P_p(t) - P_l(t)}}(\dot{x}_{cy,d} - \dot{x}_{cy})$$

$k_{xvs}$ is a gain parameter,
$P_p(t)$ is actual pressure,
$P_l(t)$ is a load pressure associated with the first valve and the hydraulic cylinder,
$\dot{x}_{cy,d}$ is the desired velocity of the hydraulic cylinder, and
$\dot{x}_{cy}$ is the measured velocity of the hydraulic cylinder.

27. A hydraulic system in accordance with claim 26, wherein the first valve has first and second orifices, the determining the desired force F(t) to be applied to the valve is in accordance with:

$$F(t) = k_{xvs}\left(\frac{k_v}{\sqrt{P_p(t) - P_l(t)}} + k_{vf1}\sqrt{P_p(t) - P_l(t)} + \frac{k_{vf2}P_r}{\sqrt{P_p(t) - P_l(t)}}\right)(\dot{x}_{cy,d} - \dot{x}_{cy})$$

where $k_v$ is a spring constant associated with a spring included the first valve,
$k_{vf1}$ is a coefficient of a steady state flow force associated with the first valve orifice, and
$k_{vf2}$ is a coefficient of a steady state flow force associated with the second valve orifice.

28. A method of controlling a hydraulic cylinder, the hydraulic cylinder receiving fluid from a valve, comprising:
receiving a user input;
determining a desired velocity of the hydraulic cylinder in accordance with the user input;
measuring the velocity of the hydraulic cylinder;
determining a difference between the desired velocity of the hydraulic cylinder and the measured velocity of the hydraulic cylinder;
determining a desired position of the valve in accordance with the difference between the desired velocity of the hydraulic cylinder and the measured velocity of the hydraulic cylinder;
determining a force to be applied to the valve in accordance with a difference between the desired position of the valve and an actual position of the valve;
actuating the valve in accordance with the force; and
actuating the hydraulic cylinder with the fluid from the actuated valve.

29. A method in accordance with claim 1, wherein the moving of the hydraulic cylinder is in accordance with an adaptive mechanism.

30. A hydraulic system including:
a hydraulic cylinder provided with a chamber;
a valve, the hydraulic cylinder being configured to receive fluid from the valve and output fluid to the valve;
a sensor coupled to the hydraulic cylinder, the sensor being configured to measure a velocity of the hydraulic cylinder;
a control circuit coupled to the sensor and the valve, the control circuit being configured to receive a user input, determine a desired velocity of the hydraulic cylinder in accordance with the user input, determine a desired force to be applied to the valve in accordance with a difference between the desired velocity of the hydraulic cylinder and a measured velocity of the hydraulic cylinder, and control actuation of the valve in accordance with the desired force such that the fluid is injected into the chamber to thereby move the hydraulic cylinder; and
a variable delivery pump, the variable delivery pump being configured to supply the fluid to the valve under control of the control circuit.

* * * * *

UNITED STATES PATENT AND TRADEMARK OFFICE
CERTIFICATE OF CORRECTION

PATENT NO. : 7,130,721 B2  Page 1 of 1
APPLICATION NO. : 10/975984
DATED : October 31, 2006
INVENTOR(S) : Wear et al.

It is certified that error appears in the above-identified patent and that said Letters Patent is hereby corrected as shown below:

IN THE CLAIMS

In Column 12, Line 63, in Claim 4, delete " $\hat{X}_{cy,d}$ " and insert -- $\dot{x}_{cy,d}$ --

In Column 12, Line 64, in Claim 4, delete " $\hat{X}_{cy}$ " and insert -- $\dot{x}_{cy}$ --

Signed and Sealed this

Sixth Day of May, 2008

JON W. DUDAS
*Director of the United States Patent and Trademark Office*